Feb. 22, 1949.     G. E. DATH     2,462,167
RATCHET AND PAWL MECHANISM FOR HAND BRAKES
Filed March 11, 1946
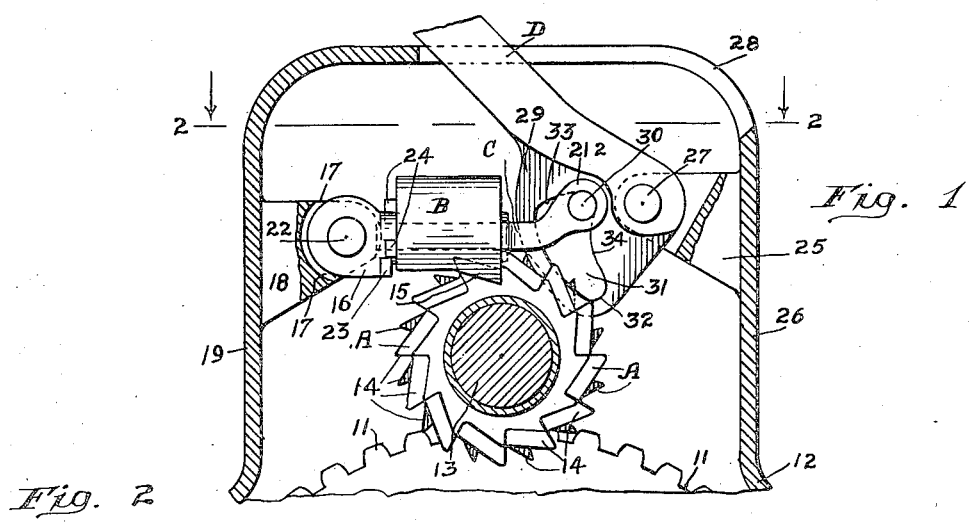
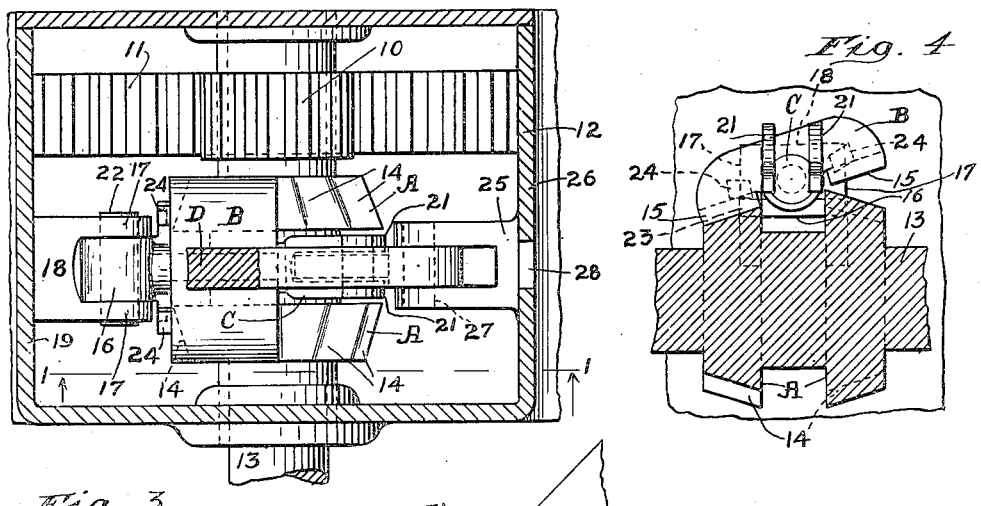
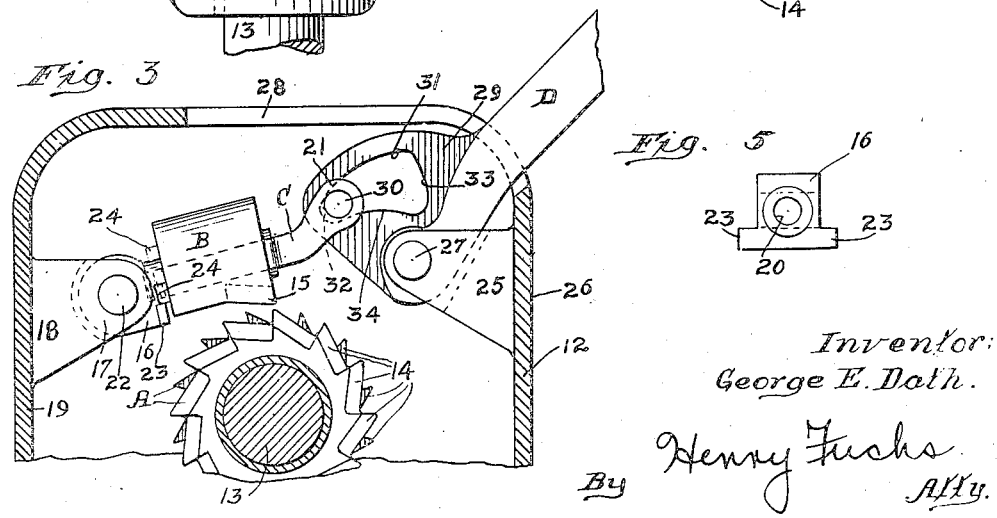
Inventor:
George E. Dath.
By Henry Fuchs
Atty.

Patented Feb. 22, 1949

2,462,167

UNITED STATES PATENT OFFICE 2,462,167

RATCHET AND PAWL MECHANISM FOR HAND BRAKES

George E. Dath, Mokena, Ill., assignor to W. H. Miner, Inc., Chicago, Ill., a corporation of Delaware Application March 11, 1946, Serial No. 653,651

12 Claims. (Cl. 188—81.1)

This invention relates to improvements in hand brakes for railway cars.

One object of the invention is to provide a hand brake mechanism comprising a rotary chain winding member, rotary ratchet means rotatable with said winding member, and locking means cooperating with the ratchet means for holding the mechanism against movement in brake releasing direction, wherein the locking means provides for relatively fine ratcheting adjustment in applying the brakes.

A more specific object of the invention is to provide a hand brake mechanism of the power multiplying, gear driven type, comprising a rotary brake tightening element, power multiplying gear means for driving the tightening element, and ratchet means for locking the brake mechanism against rotation in releasing direction, wherein the ratchet means comprises a pair of rotary ratchet wheels having their teeth staggered and a locking dog cooperating with the ratchet wheels, the locking dog being mounted for rocking movement and having teeth at opposite ends thereof alternately engageable with the teeth of the ratchet wheels, respectively, during ratcheting action of the mechanism.

Another object of the invention is to provide in a mechanism as set forth in the preceding paragraph, manually controlled means, actuated by a single operating lever for bringing the locking dog into engagement with the ratchet wheels and completely disengaging the same therefrom.

Other objects of the invention will more clearly appear from the description and claims hereinafter following.

In the drawing forming a part of this specification, Figure 1 is a vertical sectional view of the upper portion of a gear operated hand brake mechanism, illustrating my improvements in connection therewith, said section corresponding substantially to the line 1—1 of Figure 2. Figure 2 is a horizontal sectional view, corresponding substantially to the line 2—2 of Figure 1. Figure 3 is a view, similar to Figure 1, illustrating the position of the parts of the mechanism at the time the locking dog is completely disengaged from the ratchet wheel. Figure 4 is a longitudinal, vertical sectional view, through the ratchet means, of my improved mechanism, looking from right to left in Figure 1, the locking dog member of the ratchet means being shown in elevation. Figure 5 is an elevational view of the head member of the supporting element for the locking dog, looking from right to left in Figure 1.

As illustrated in the drawing, my improvements are employed in connection with a well-known type of power multiplying, gear driven brake, including the usual brake drum, not shown, on which the chain is wound, the drum being rotated by a driving pinion 10 actuated by the hand wheel of the brakes, not shown, and meshing with a gear 11 which is rotatable with the winding drum. The parts of the brake mechanism are contained in the usual housing, which is indicated by 12.

My improved hand brake mechanism proper comprises broadly a pair of ratchet wheels A—A rotatable with the driving pinion of the power multiplying gear brake; and oscillating locking dog B; a pivoted supporting member C by which the locking dog is carried; and a lever D for throwing the dog into engagement with the ratchet wheel and disengaging the same therefrom.

The two ratchet wheels A—A are formed integral with the shaft 13 which also has the pinion 10 fixed thereto. The ratchet wheels A—A are laterally spaced apart, as shown in Figures 2 and 3, and each wheel is provided with a set of peripheral ratchet teeth 14 which are staggered with respect to the teeth of the other wheel, that is, one wheel has the teeth thereof advanced with respect to the teeth of the other wheel approximately a distance of a half a tooth. The teeth of the two ratchet wheels are preferably beveled in reverse direction, as shown, that is, the teeth of the left hand ratchet wheel, as seen in Figure 4, slope inwardly toward the left with respect to the longitudinal central axis of the shaft 13 and those of the right hand wheel A inwardly toward the right with respect to said axis. Although the two ratchet wheels A—A are, in effect, separate elements and have been so described, it will be evident that a single ratchet wheel having two sets of teeth which are laterally spaced will serve the same purpose and that the two wheels A—A herein illustrated may be regarded as a single wheel of this character.

The locking dog B is supported above the ratchet wheels A—A, being pivoted between its ends on the supporting member C which extends at right angles to the axis of rotation of the shaft 13. As shown most clearly in Figure 4, the dog B has teeth 15—15 at opposite ends thereof engageable respectively with the teeth 14—14 of the ratchet wheels A—A.

The supporting member C is in the form of an elongated bar having a head member 16 at its inner or left hand end, as seen in Figures 1, 2, and 3, which is pivoted between the arms 17—17 of a forked bracket 18, projecting from the inner side of the left hand side wall 19 of the housing 12. The head 16 is preferably in the form of a separate element threaded on the end of the bar proper, the same being in the nature of a block provided with a screw threaded socket member 20 receiving the threaded inner end of the bar proper. At the outer or right hand end thereof, as seen in Figures 1, 2, and 3, the bar-like member C is provided with an upwardly bent portion which is forked, presenting laterally spaced arms 21—21. The head 16 of the member C is swingingly supported on the bracket 18 by a horizontally disposed pivot pin 22 extending through said head and the arms 17—17 of the bracket. Outwardly beyond the ends of the arms of the bracket 18, the head 16 of the supporting member C is provided with forwardly extending, laterally projecting, horizontal stop flanges 23—23 at the bottom thereof, which serve as stops to limit swinging oscillating movement of the dog B, the latter being provided with spaced stop lugs 24—24 on its rear side which are located at opposite sides of the axis of rotation of the dog and respectively engage with said flanges 23—23.

The lever D is swingingly supported at its lower end on an inwardly projecting forked bracket 25 extending from the inner side of the right hand side wall 26 of the housing 12, as seen in Figures 1, 2, and 3, a pivot pin 27 extending through the arms of the bracket and the lower end portion of said lever being provided for that purpose. The lever D extends through the top wall of the housing, the latter being slotted, as indicated at 28, to accommodate the lever for swinging movement. At the pivoted end thereof, the lever D is provided with a platelike, sector-shaped flange 29, which is embraced between the arms 21—21 of the pivoted supporting member C, and the latter is operatively connected to the lever D by a pin 30 extending through the outer ends of the arms 21—21 and through a relatively large opening 31 in said platelike flange 29 of the lever. The opposite end walls of the opening 31 present abutment faces or shoulders 32 and 33 which cooperate with the pin 30 to lift and depress the pivoted supporting member C, together with the dog B to disengage the dog from and engage the same with the ratchet wheel. The lower wall of the opening 31 is upwardly curved, as shown, and presents a cam face 34 which assists in lifting the supporting member C by engagement with the pin 30 when the lever D is swung in direction to disengage the dog from the ratchet wheels A—A.

The operation of my improved ratchet hand brake mechanism is as follows: As the brakes are being applied by rotation of the shaft 13 and the ratchet wheels A—A in clockwise direction, as viewed in Figure 1, the dog B ratchets over the teeth of said wheels, oscillating on the supporting member C and engaging said wheels alternately, the dog B being yieldingly urged against the ratchet wheels by the added weight of the lever D which, in the position shown in said figures, has the abutment shoulder 33 thereof bearing on the pin 30 of the pivoted supporting member C. Assuming that the brake has been set wtih the tooth at either end of the dog B engaged with the corresponding ratchet wheel A, and it is desired to release the brake, the attendant swings the lever D to the right, thereby forcibly withdrawing the dog out of engagement with said ratchet wheel, as shown in Figure 3. The supporting member C being swung upwardly on its pivot 22 by engagement of the abutment shoulder 32 of the lever with the pin 30 at the outer end of the supporting member. During this swinging movement of the lever, the cam face 34 assists in raising the supporting member. When in the raised position shown in Figure 3, both ends of the oscillating dog B are clear of the wheels A—A, turning of the dog about its axis of oscillation on the support C being restricted by the stop flanges 23—23 of the supporting member, which are in the paths of movement of the lugs 24—24 of the dog. As will be evident, the weight of the lever D holds the dog in disengaged position until the lever is thrown back manually to the position shown in Figure 1. Throwing the lever to the last named position forcibly engages the dog B with the ratchet wheels.

As will be evident, when the brake is being tightened by rotation of the ratchet wheels A—A, the teeth of these two wheels being staggered, the teeth at opposite ends of the dog B will alternately be brought into holding engagement with said wheels, thus effectively locking the same and the brake mechanism against reverse rotation at intervals of rotary advance of the mechanism, corresponding to one half of the amount of rotation thereof required to advance the usual single ratchet wheel one tooth, thus permitting the brakeman to tightly set the brakes even when the resistance encountered is too great to allow rotation of the brake mechanism to an extent equivalent to the advance of one tooth of the usual single ratchet wheel.

From the preceding description taken in connection with the drawings, it will be further evident that the actuating lever remains at rest during the ratcheting action of the mechanism, the swiveled dog, in its alternate engagement with the ratchet wheels, acting in the manner of an escapement mechanism, rocking to and fro on the support C without imparting any substantial movement to the lever D, thus avoiding oscillation or bouncing of the lever which is a very objectionable feature of the usual ratchet hand brake mechanism of the single ratchet type having a lever controlled locking dog.

I claim:

1. In a hand brake mechanism, the combination with a member adapted to be rotated to effect tightening of the brake; of ratchet means rotatable with said member, said ratchet means having two annular sets of ratchet teeth, the teeth of each of said sets being staggered with respect to the teeth of the other set; an oscillating dog pivoted between its ends having ratcheting engagement at opposite ends with said sets of ratchet teeth, respectively; and manually controlled means for moving said dog into and out of engagement with said ratchet means.

2. In a hand brake mechanism, the combination with a member adapted to be rotated to effect tightening of the brake; of ratchet means rotatable with said member, said ratchet means having two sets of ratchet teeth, the teeth of each of said sets being staggered with respect to the teeth of the other set; an oscillating dog pivoted between its ends and having teeth at opposite ends, the tooth at one end thereof having engagement with one of said sets of ratchet teeth, and the tooth at the other end thereof having ratcheting engagement with the other set of ratchet teeth; and manually controlled means for bodily moving said dog into and out of engagement with said ratchet means.

3. In a hand brake mechanism, the combination with a member adapted to be rotated to effect tightening of the brake; of ratchet means rotatable with said member, said ratchet means having two sets of annular ratchet teeth, the teeth of each of said sets being staggered with respect to the teeth of the other set; a movable support; a dog pivoted between its ends on said support for oscillating movement, said dog having teeth at its opposite ends, the tooth at one end thereof being engageable with one of said sets of ratchet teeth, and the tooth at the other end thereof being engageable with the other set of teeth; and manually actuated means for moving said support toward and away from said ratchet means to engage the dog therewith and disengage the same therefrom.

4. In a hand brake mechanism, the combination with a member adapted to be rotated to effect tightening of the brake; of ratchet means rotatable with said member, said ratchet means having two sets of ratchet teeth, the teeth of each of said sets being staggered with respect to the teeth of the other set; a support pivoted at one end for swinging movement toward and away from said ratchet means; a dog pivoted between its ends on said support for oscillating movement, said dog having teeth at opposite ends engageable respectively with said sets of ratchet teeth; and manually actuated means for swinging said support toward and away from said ratchet means to engage the dog therewith and disengage the same therefrom.

5. In a hand brake mechanism, the combination with a member adapted to be rotated to effect tightening of the brake; of ratchet means rotatable with said member, said ratchet means having two sets of ratchet teeth, the teeth of each of said sets being staggered with respect to the teeth of the other set; a support pivoted at one end for swinging movement toward and away from said ratchet means; a dog pivoted between its ends on said support for oscillating movement, said dog having teeth at opposite ends engageable respectively with said sets of ratchet teeth; and manually actuated means having lost motion connection with the free end of said support for swinging the latter toward and away from said ratchet means to engage the dog therewith and disengage the same therefrom.

6. In a hand brake mechanism, the combination with a member adapted to be rotated to effect tightening of the brake; of ratchet means rotatable with said member, said ratchet means having two sets of ratchet teeth, the teeth of each of said sets being staggered with respect to the teeth of the other set; a support pivoted at one end for swinging movement toward and away from said ratchet means; a dog pivoted between its ends on said support for oscillating movement, said dog having teeth at opposite ends engageable respectively with said sets of ratchet teeth; and a manually operated, pivoted lever having lost motion connection at its pivoted end with the free end of the support for swinging said support toward and away from the ratchet means to engage said dog with said ratchet means and disengage the same therefrom.

7. In a hand brake mechanism, the combination with a member adapted to be rotated to effect tightening of the brake; of a pair of coaxial ratchet wheels rotatable with said member, each of said wheels having a set of peripheral ratchet teeth, the teeth on each wheel being staggered with respect to the teeth of the other wheel; an oscillating dog pivoted between its ends having ratcheting engagement respectively with said ratchet wheels; and manually controlled means for bodily moving said dog into and out of engagement with said ratchet wheels.

8. In a hand brake mechanism, the combination with a member adapted to be rotated to effect tightening of the brake; of a pair of coaxial ratchet wheels rotatable with said member, each of said wheels having a set of peripheral ratchet teeth, the teeth on each wheel being staggered with respect to the teeth of the other wheel; an oscillating dog pivoted between its ends and having teeth at opposite ends thereof having engagement with the teeth of said respective ratchet wheels; and manually operated means for bodily moving said dog into and out of engagement with said ratchet wheels.

9. In a hand brake mechanism, the combination with a member adapted to be rotated to effect tightening of the brake; of a pair of coaxial ratchet wheels rotatable with said member, each of said wheels having a set of peripheral ratchet teeth, the teeth on each wheel being staggered with respect to the teeth of the other wheel; a movable support; a dog pivoted between its ends on said support for oscillating movement, said dog having teeth at opposite ends engageable with said ratchet wheels; and manually actuated means for moving said support toward and away from said ratchet wheels to engage the dog therewith and disengage the same therefrom.

10. In a hand brake mechanism, the combination with a member adapted to be rotated to effect tightening of the brake; of a pair of coaxial ratchet wheels rotatable with said member, each of said wheels having a set of peripheral ratchet teeth, the teeth on each wheel being staggered with respect to the teeth of the other wheel; a support pivoted at one end for swinging movement toward and away from said ratchet wheels; a dog pivoted between its ends on said support for oscillating movement, said dog having teeth at opposite ends engageable respectively with said ratchet wheels; and manually actuated means for swinging said support toward and away from said ratchet wheels to engage the dog therewith and disengage the same therefrom.

11. In a hand brake mechanism, the combination with a member adapted to be rotated to effect tightening of the brake; of a pair of coaxial ratchet wheels rotatable with said member, each of said wheels having a set of peripheral ratchet teeth, the teeth on each wheel being staggered with respect to the teeth of the other wheel; a support pivoted at one end for swinging movement toward and away from said ratchet wheels; a dog pivoted between its ends on said support for oscillating movement, said dog having teeth at opposite ends engageable respectively with said ratchet wheels; and manually actuated means having lost motion connection with the free end of said support for swinging the latter toward and away from said ratchet wheels to engage the dog therewith and disengage the same therefrom.

12. In a hand brake mechanism, the combination with a member adapted to be rotated to effect tightening of the brake; of a pair of coaxial ratchet wheels rotatable with said member, each of said wheels having a set of peripheral ratchet teeth, the teeth on each wheel being staggered with respect to the teeth of the other wheel; a support pivoted at one end for swinging movement toward and away from said ratchet wheels; a dog pivoted between its ends on said support for oscillating movement, said dog having teeth at opposite ends engageable respectively with said ratchet wheels; and a manually operated, pivoted lever having lost motion connection at its pivoted end with the free end of said support for swinging the latter toward and away from the ratchet wheels to engage said dog and said ratchet wheels and disengage the same therefrom.

GEORGE E. DATH.

REFERENCES CITED

The following references are of record in the file of this patent:

UNITED STATES PATENTS

| Number | Name | Date |
|--------|------|------|
| 224,524 | Farnum | Feb. 17, 1880 |